H. GERNER
LOADER.
APPLICATION FILED NOV. 15, 1916.
1,266,451.
Patented May 14, 1918.
2 SHEETS—SHEET 2.
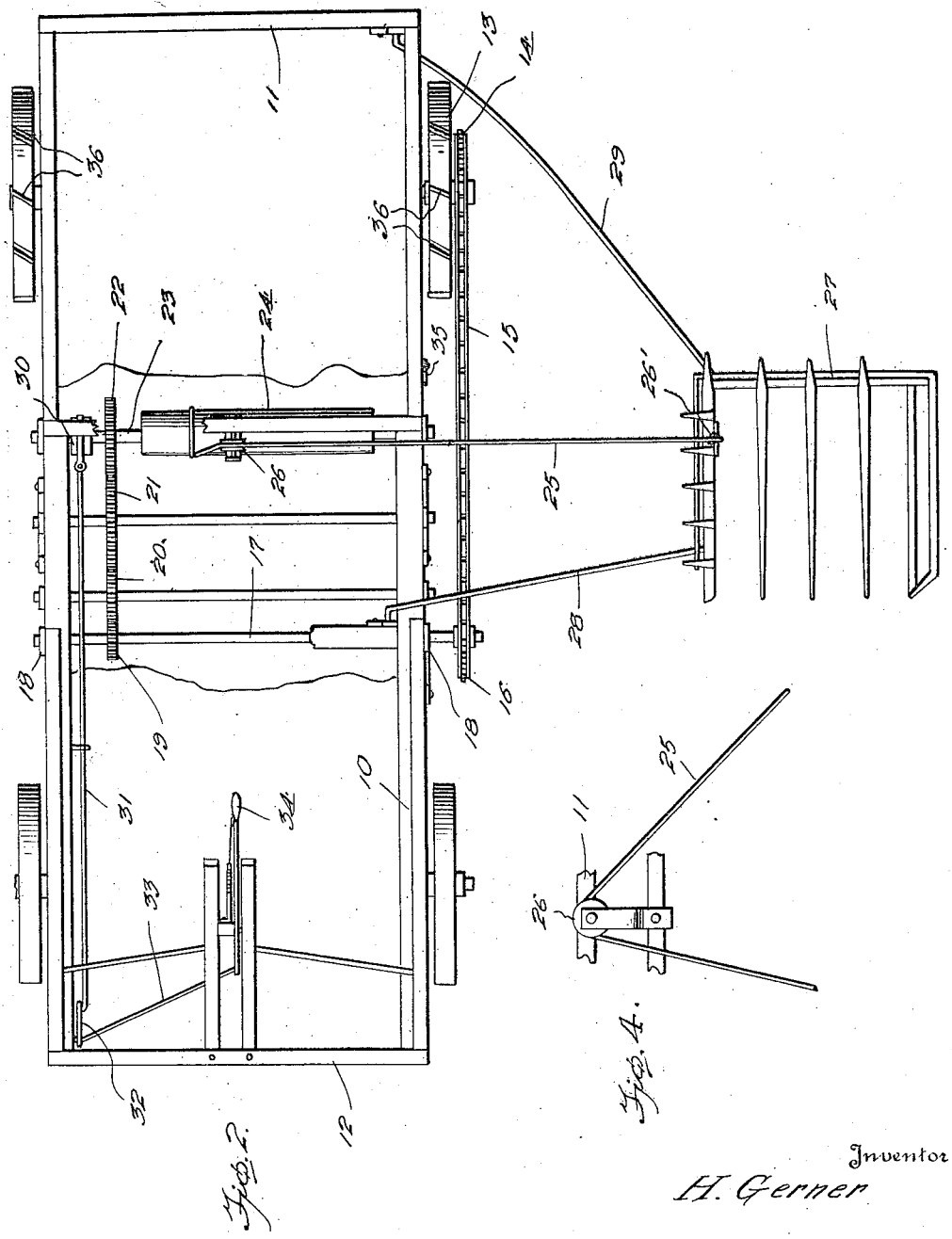
Inventor
H. Gerner
By John Louis Waters &c.
Attorney

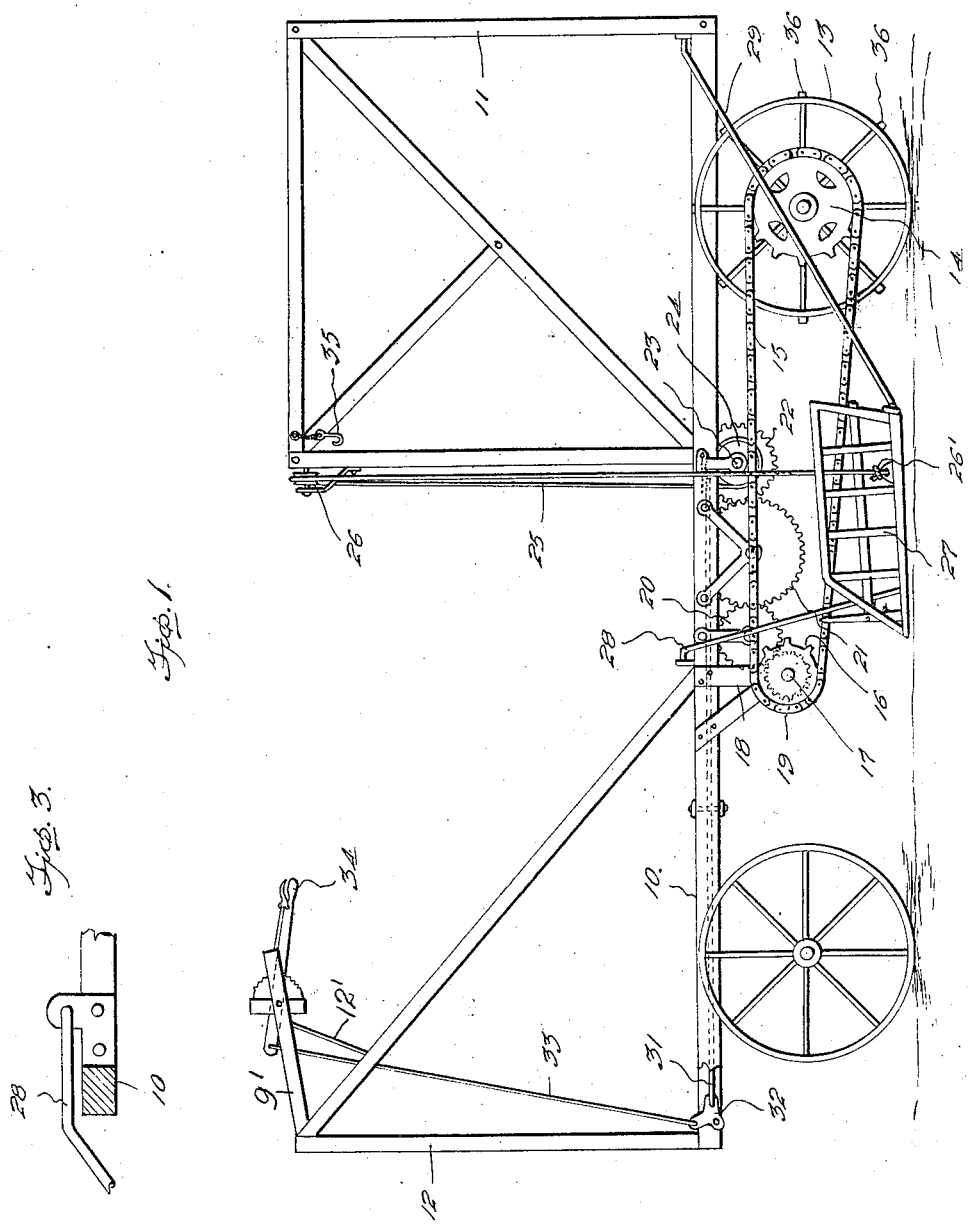

UNITED STATES PATENT OFFICE.

HARRY GERNER, OF HITTERDAL, MINNESOTA.

LOADER.

1,266,451.  Specification of Letters Patent.  Patented May 14, 1918.

Application filed November 15, 1916. Serial No. 131,508.

*To all whom it may concern:*

Be it known that I, HARRY GERNER, a citizen of the United States, residing at Hitterdal, in the county of Clay and State of Minnesota, have invented certain useful Improvements in Loaders, of which the following is a specification, reference being had therein to the accompanying drawing.

This invention relates to improvements in loaders, one object of the invention being the provision of a vehicle which carries mechanism for operating the loading fork, and which is portable so as to be readily moved from one place to another.

A further object of this invention is the provision of a novel construction of hay loader in which the loading fork is readily operated for removing the hay from the ground and placing it upon a rack or wagon, such device being portable so as to be readily moved from place to place where necessary.

In the accompanying drawings:

Figure 1 is a side elevation of the complete loading apparatus.

Fig. 2 is a top plan view thereof.

Figs. 3 and 4 are detail views of various parts of the structure.

Referring to the drawings, the numeral 10 designates the base frame of the loader which has connected to the rear end thereof the super-structure 11, while connected to the forward end is the super-structure 12.

The tractor wheel 13 is provided with a sprocket wheel 14 which through the sprocket chain 15 is connected to the small sprocket wheel 16 fast to the transverse shaft 17.

This shaft 17 is journaled in the brackets 18 and has fast thereon a pinion 19 which through the intermediate pinion 20 transmits motion to the large pinion 21 which in turn transmits motion to the pinion 22, loose on the shaft 23.

The shaft 23 is provided with a windlass 24 to which is connected the cable 25, the same being extended upwardly and over the pulley 26 at the top of the super-structure 11, and has its free end connected as at 26' to the fork 27.

This fork 27 is swingingly connected to the base frame 10 by means of the front rod 28 and the rearwardly extending rod 29 which hold the fork a predetermined distance beyond the side of the loader and permit the same to be swung upwardly and inwardly to dump the fork at the proper time either within the present structure or upon a wagon to receive the hay.

With a view toward providing improved clutch mechanism of any suitable form (not illustrated) means for rigidly connecting the pinion 22 to the shaft so that the windlass will be operated to raise the fork, a sleeve 30 is rigidly connected to the pinion 22 and is normally loose on the shaft being provided on its free end with opposed longitudinal slots 31. Semi-circular grippers 32 are now disposed about the sleeve and are provided with peripheral grooves 33 in which is disposed a split band 34. The brake band 35 is arranged about the split band 34 and has one end rigidly connected to a block 36 carried by the frame 10 while a rod 37 is connected to the opposite end thereof. This rod 37 has its other end pivoted to a bell crank lever 38 which is in turn pivoted on the forward end of the frame 10. A manually operable lever 39 is pivoted to the front superstructure and is operably connected to the bell crank lever by means of a rod 40. By this arrangement it will be appreciated that when the lever 39 is swung the rod 31 will be consequently moved so as to draw the band 35 into engagement with the band 34. Continued pressure of the main operating lever causes the split band to contract and act on the grippers 32 which in turn bear against the sleeve 30 so as to removably hold it in frictional engagement with the shaft 23 in order that the shaft 23 may be rotated.

It will be seen that the superstructure or upright frame 12 has a pair of diagonal struts secured to the upper end thereof as well as to the central portion of the main frame. A pair of rearwardly and upwardly projecting arms 9' are secured to the upper end of the upright frame and are rigidly supported in position by means of the brace rods 12' which connect the upper portions of the struts and the rear ends of said arms.

In this manner with the operator seated at the top of the super-structure 12, the clutch mechanism may be actuated to elevate the fork 27, the power being secured from the rear wheel 13 during the movement of the loader over the surface traversed. Upon one of the upper side rails of the superstructure 12 is loosely mounted a hook 35 which is designed for engagement with the fork 27 when raised to hold the same elevated, as will be clearly apparent. On the wheels 13, at intervals crosswise of the treads thereof, are anti-slipping ribs or cleats 36 which prevent the wheels from slipping upon mud or other slippery surfaces when the machine is in use.

The apparatus or machine can be used to throw shocks of wheat, oats, barley, rye, flax or any other kinds of shocks of grain and hay, thereby eliminating the necessity of labor to pitch the same upon the rack, as will be obvious. Of course, it is to be appreciated that when the operating lever 39 is moved to release the clutch owing to the weight of the fork it will be automatically lowered into operative position adjacent the ground.

What I claim as new is:—

1. In a device of the class described, in combination, a rectangular vehicle frame, traction wheels upon which said frame is mounted, a standard mounted thereupon, a pair of brackets disposed vertically upon said frame, one being mounted at one end of said frame and the other at a point in advance of said standard, a rectangular rack, a pair of front and rear rods, the front rod having an angular portion forming a pintle received in the last mentioned bracket, and having its lower end secured to one side of said rack, the rear rod being longer than the front rod and also having an angular portion forming a pintle received in the other bracket and disposed in alinement with the first named pintle, the last named rod being secured at its lower end to the rear side of the rack and near the corner thereof and at a lesser angle thereto with respect to the first rod, the points of the rods where they are attached to said rack being in the same plane, said last named rod being curved around one of said traction wheels and flexible means carried by said standard and secured to the inner side of said rack for raising and lowering the same swingingly by means of said rods, both of said rods being inclined downwardly and outwardly from the side of said frame to so position said rack as to enable it to scoop hay or the like.

2. In a device of the class described in combination a rectangular frame, wheels upon which said frame is mounted, an upright forward frame secured at one end of the said main frame, a pair of diagonal struts secured to the upper end of said upright frame and to the central portion of the main frame, a pair of rearwardly and upwardly projecting arms secured to the upper end of said upright frame, brace rods connecting the upper portions of said struts and the forward ends of said arms, a pin extending transversely between said arms, a support mounted upon said named pin, a rack mounted upon said support, a lever fulcrumed upon said pin along side of said support, a latch carried by said lever engageable with said rack, a rigid rod connected to the upper end of said lever at one point, a bell crank lever on said frame to which the opposite end of said rod is secured, a clutch mechanism on said main frame, and means controlled by said bell-crank lever for operating said clutch.

In testimony whereof I affix my signature.

HARRY GERNER.

Copies of this patent may be obtained for five cents each, by addressing the "Commissioner of Patents, Washington, D. C."